Nov. 10, 1936.  R. W. CHALMERS  2,060,033

CAR LOADING DEVICE

Filed Aug. 20, 1931  2 Sheets-Sheet 1

INVENTOR
Raymond W. Chalmers.
BY
Harness, Dickey, Pierce & Hann,
ATTORNEYS.

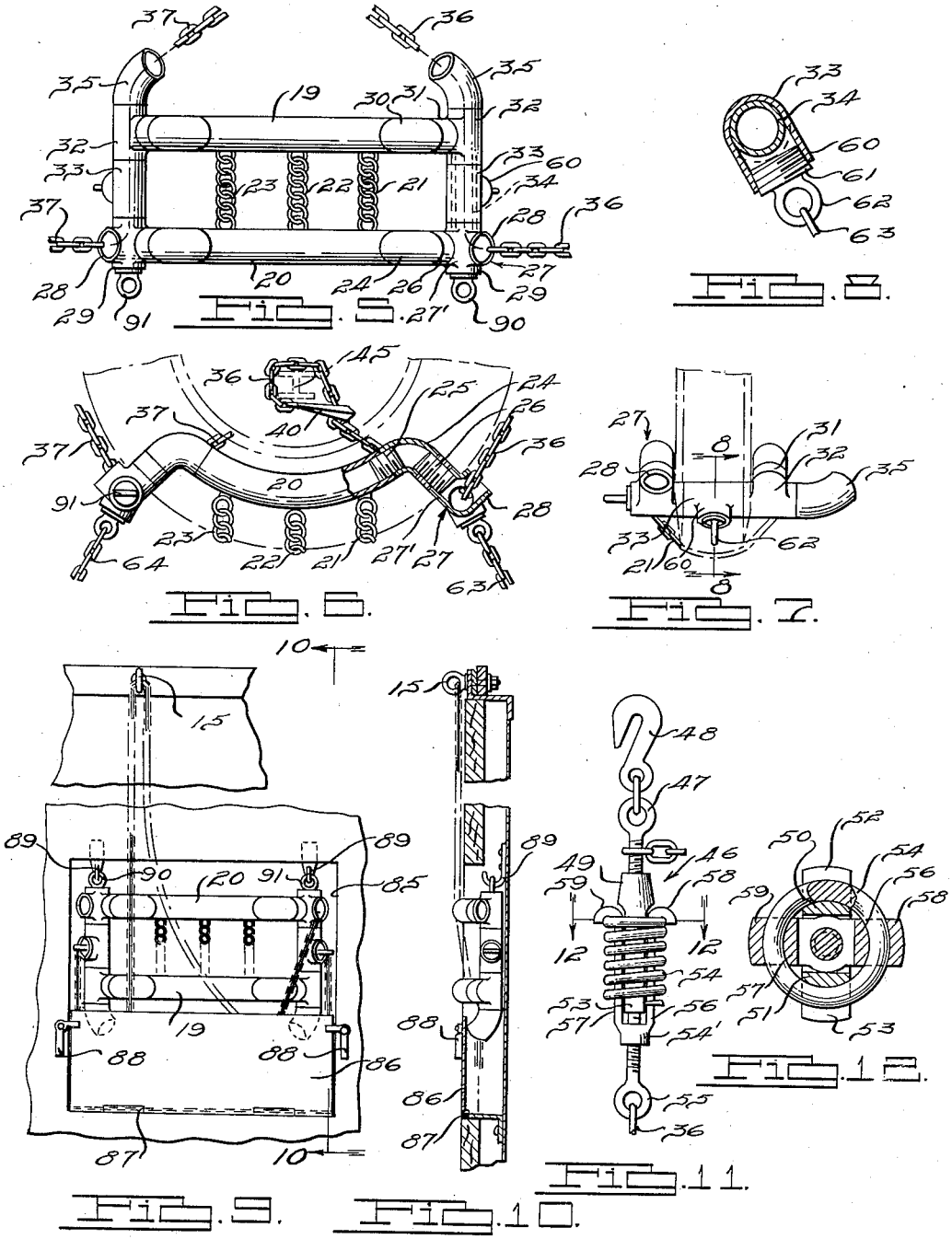

Patented Nov. 10, 1936

2,060,033

UNITED STATES PATENT OFFICE 2,060,033

CAR LOADING DEVICE

Raymond W. Chalmers, Detroit, Mich., assignor, by mesne assignments, to The Worth Company, a corporation of Michigan Application August 20, 1931, Serial No. 558,238

7 Claims. (Cl. 105—368)

The invention relates to loading devices and it has particular relation to devices for securing motor vehicles in freight cars for transportation purposes.

The principal objects of the invention are to provide improved means for suspending a motor vehicle in a freight car or the like, which are of inexpensive construction, and so designed as to have great strength and durability, such factors being of considerable importance when the load suspended by such means is considered; to provide vehicle suspending devices, for use in a freight car, which fit in recesses in the side walls of the freight car provided for this purpose, from which it follows that the devices when not in use are in out-of-the-way positions; to provide suspending devices of this character which are easily adjustable laterally and vertically of the freight car thereby adapting them to support motor vehicles of different lengths and to support such vehicles in various positions with respect to the floor of the car; and to provide particularly, means in a freight car or the like for suspending a vehicle in such manner that one end thereof is above the other end, or in other words, the vehicle is disposed in a plane inclined to the floor of the freight car and suspended from points thereabove.

For a better understanding of the invention, reference may be had to the accompanying drawings forming a part of the specification wherein:

Fig. 5 is a plan view of a part of the vehicle suspending means which embraces the lower side of a tire on the vehicle;

Fig. 6 is a side elevational view of the construction shown by Fig. 5;

Fig. 7 is an end elevational view of the construction shown by Fig. 6;

Fig. 8 is a cross sectional view on a larger scale taken substantially along the line 8—8 of Fig. 7;

Fig. 9 is a fragmentary view of the side wall of the freight car illustrating the manner in which the vehicle suspending means is disposed in an out-of-the-way position in a recess in such wall;

Fig. 10 is a cross-sectional view taken substantially along the line 10—10 of Fig. 9;

Fig. 11 illustrates a resilient or spring element employed in the suspension connection between an upper part of the freight car and the tire embracing means shown by Fig. 5;

Fig. 12 is a cross-sectional view on a larger scale, taken substantially along line 12—12 of Fig. 11.

Figure 1:
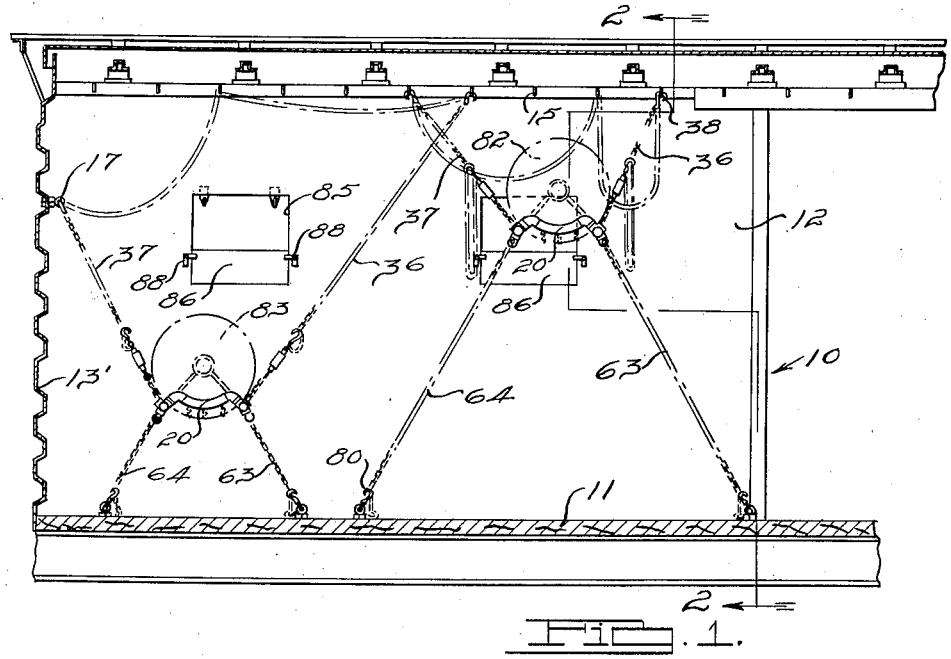
Figure 1 is a fragmentary, longitudinal cross-sectional view of a freight car illustrating car loading devices for supporting a motor vehicle, which are constructed according to one form of the invention.

Referring to Fig. 1, the numeral 10 indicates a freight car having a floor 11, side walls 12 and 13, and end walls 13'. At their upper edges, the side walls 12 and 13 are provided with longitudinally extending, inwardly offset, angle bars 14, and spaced longitudinally of the latter, eye bolts 15 are secured thereto by means of nuts 16, the eye portions of the bolts being inside of the car, and the nuts being on the outer side of the bars. Similar eye bolts 17 are secured to each end wall near the upper edge thereof.

For suspending a wheel of a motor vehicle in the freight car, a tire and axle embracing member is provided which is best shown by Figs. 5, 6, and 7. This member comprises short, arcuate sections of pipe 19 and 20 interconnected by sections of ring chains 21, 22, and 23 adapted to support a tire disposed between the pipe sections. Each end of each pipe section is provided with a downwardly directed elbow 24 threaded into the end of the pipe as indicated at 25, and the opposite end of the elbow 24 has threaded engagement with one end of a nipple 26. The opposite end of the nipple 26 is threaded into one leg 27' of a pipe joint 27 which has a second leg 28 projecting upwardly at substantially right angles to the first leg. The legs 27 and 28 are joined to a short tubular portion 29, it being understood that the openings in legs 27 and 28 communicate with the opening in the tubular portion.

Each end of the pipe section 19 similarly to pipe section 20, is provided with an elbow 30, connected to a nipple 31 which in turn is connected to a T joint section of pipe 32, the cross part of the T joint being aligned with the tubular section 29. Between the adjacent ends of parts 29 and 32, a short section of pipe 33 is provided in alignment therewith, which is rotatably mounted on a sleeve 34 threaded into the parts 29 and 32. The opposite end of part 32 is provided with a sort of elbow joint 35, such elbows at opposite ends of the pipe 19 extending slightly upward, in a converging manner.

The device shown by Fig. 5 is adapted to be suspended from the eye bolts 15 as shown by Fig. 1, by means of chains 36 and 37 having hooks 38 at their upper ends engaging bolts. The chain 36, as best shown by Fig. 5, extends through the leg 28 at one end of the pipe section 20, through the tubular section 29 integral therewith, through the section 33, through the part 32 of the T joint at one end of pipe 19, through the elbow 35, and terminates, as shown by Fig. 6, in a hook 40. Similarly, the chain 37 extends through corresponding parts at the opposite ends of pipes 19 and 20, and terminates in a hook such as that indicated at 40.

As stated previously, one of the tires of the vehicle fits between the pipes 19 and 20 and is supported by the ring chains, and also the tire when so positioned abuts the section 33. In suspending one of the wheels by means of a device of this character, the free ends of the chains 36 and 37 are swung around the axle of the vehicle indicated at 45 in Fig. 6, and then the hooks 40 are engaged with the chains to secure the latter to the axle.

Each of the chains, shown in Fig. 11 includes a spring connection 46 which comprises an upper eye bolt 47 having a hook 48 connected thereto, which is threaded at its lower end into the upper end of a bifurcated member 49. The legs of bifurcated member 49 indicated at 50 and 51 in Fig. 12, terminate at their lower ends in oppositely directed offset shoulder portions 52 and 53, and a helical spring 54 encircling the legs 50 and 51, at its lower end, abuts the shoulders 52 and 53. A lower bifurcated member 54' threaded on one end of an eye bolt 55 having connection with the lower part of the chain, has legs 56 and 57 extending upwardly through the spring 54, in 90 degree displacement relation with respect to the legs 50 and 51 of the bifurcated member 49. The upper ends of the legs 56 and 57 are curled over the upper coil of the spring 54 as indicated at 58 and 59, and consequently, the members 49 and 54 can move with respect to each other, their movement being governed by the spring connecting them. The length of either of the chains 36 and 37 may in effect be varied by securing the hook 48 to various links in the upper part of the chain, although this part of the chain always is connected to the eye bolt 47 to maintain the chain parts associated. As shown in the drawings eye bolt 47 is provided with a conventional right hand thread, while eye bolt 55 is provided with a left hand thread. Hence, the rotation of the bifurcated members 49 and 54 draws the eye bolts toward each other or spreads them apart to increase or decrease the tension on chains 36 or 37. This permits the desired final adjustment of the spring tension.

Figures 2, 3, 4:
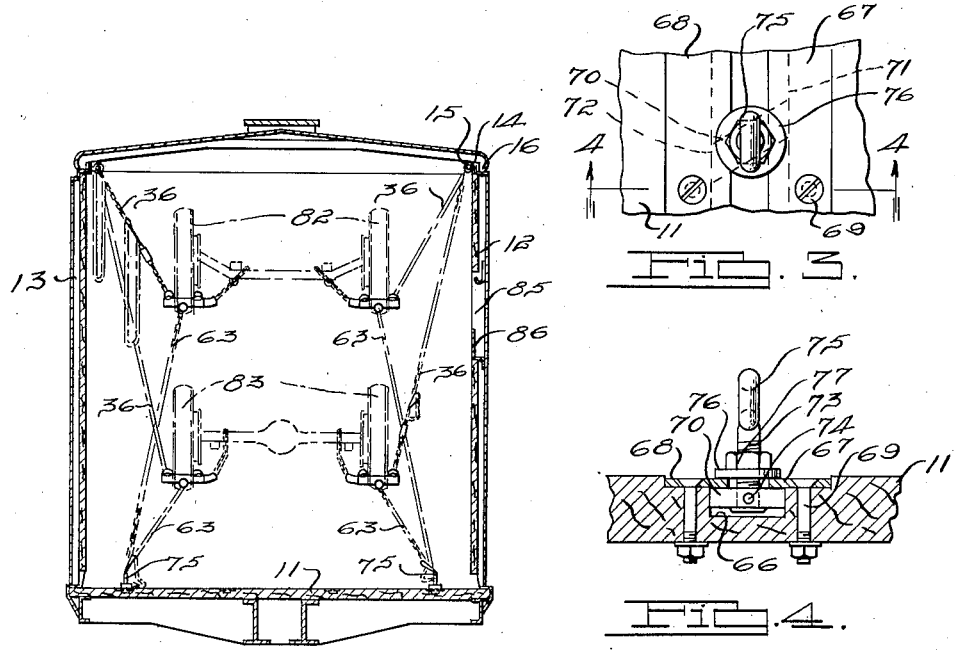
Fig. 2 is a cross-sectional view taken substantially along the line 2—2 of Fig. 1.
Fig. 3 is a fragmentary plan view of the floor of the freight car, illustrating an adjustable anchoring device mounted in a groove in the floor.
Fig. 4 is a cross-sectional view taken substantially along line 4—4 of Fig. 3.

The pipe members 33 are free to turn with respect to the parts 29 and 32 at opposite ends thereof, and each of such sections is provided with an offset tubular leg 60 shown by Fig. 8 particularly, which has a plug 61 threaded therein that has an eye 62. Chains 63 and 64 connected to these eyes extend in diverging relation as shown by Fig. 1 toward the floor of the freight car. Adjacent each side wall the floor of the freight car is provided with a groove 66 as shown in Fig. 4 and the floor at opposite sides of the groove is provided with metal straps 67 and 68 secured to the floor by means of bolts 69. These straps extend partially over the groove and normally retain a block 70 therein which as best shown by Fig. 3 has tapered ends 71 and 72 adapted to engage the side walls of the groove when the block is disposed in angular relation with respect thereto. An eye bolt 73 secured to the block 70 as indicated at 74, projects upwardly between the straps 67 and 68 and terminates in an eye 75, and a collar 76 on the eye bolt abuts the upper sides of the metal straps and is retained firmly thereagainst by means of a nut 77 on the bolt. By means of this arrangement the eye bolt may be securely anchored to the floor of the freight car but by loosening the nut 77, it may be moved longitudinally of the groove into any position desired. Also it is apparent that by turning the eye bolt 75 in one direction, clockwise as seen in Fig. 3, the block 70 in the groove may be aligned with the opening between the metal straps 67 and 68 and then the bolt and block may be removed from the groove.

The lower ends of the chains 63 and 64 are secured to such eye bolts 75 and the connections are adjustable by means of hooks 80 associated with the eye bolts which are adapted to engage various links in the chain.

In suspending the motor vehicle in the freight car it is desirable that one end of the car be displaced vertically with respect to the other end and it will be noted in Fig. 1 that the suspending means have been arranged to secure this result. The front tires of the vehicle for example indicated at 82 are suspended by means of the chains connected to the eye bolts 15, and the lower set of chains assist in maintaining the tire in position and are connected to the eye bolt devices mounted in the grooves at opposite sides of the freight car floor. The rear tires indicated at 83 are suspended by chains connected to one of the eye bolts 15 and to one of the eye bolts 17 on the end wall of the car while lower chains are provided which are adjustably anchored in the grooves of the floor in the manner previously described.

It will be noted in Fig. 2 that the chains extending to each vehicle tire supporting device converge toward the latter, and toward the center part of the car from points adjacent the lower and upper edges of the side walls of the car. It also will be noted that the lower chains diverge downwardly to the floor of the car and that the chains of the upper pair diverge upwardly. When the parts are so arranged the motor vehicle is secured in position against any undesirable movement and are prevented from engaging walls of the freight car. The springs 54 in the upper chains suspending the vehicle, resiliently permit some movement of the vehicle in a cushioning manner but normally will prevent any undesirable movement thereof. Hence the vehicle is suspended in the freight car in a cushioning manner which will positively prevent any injury or damage being done to the vehicle during transportation thereof.

When the suspending devices are not in use, they are disposed in apertures indicated at 85 in the side walls of the car. Each of these apertures as best shown by Figs. 9 and 10, has its lower part normally closed by means of a cover plate 86 pivoted as indicated at 87 to the wall of the car and which in its normal position is maintained closed by latches 88. The outer lining of the wall at the upper terminus of the recess is provided with hooks 89 adapted to cooperate with hooks 90 and 91 secured to joints section 27 at opposite ends of the section 20 of the tire supporting device. When it is desired to dispose one of the tire supporting devices in the recess or aperture 85, the cover 86 is pivoted downwardly and after disposing the device in the aperture the cover is moved into its closing position and retained by the latches 88. It, of course, should be understood that when the devices are disposed in the apertures, the anchoring devices in the grooves in the floor of the freight car are removed and then they may be disposed also in the aperture or suspended from the eye bolts 15 in out-of-the-way positions. Similarly, any loose chains may be connected to the eye bolts so that they will not interfere with ordinary use of the freight car.

Motor vehicles mounted in freight cars in this manner may be said to be suspended in a cushioning manner which will permit some but not an undesirable movement of the vehicle, and consequently jolts and sudden starting and stopping of the freight car, while causing some movement of the vehicle will relieve it from any of the shocks imparted to the freight car. The fact that the chain connections between the car and the tire embracing devices extend toward the side walls of the car at an angle to the plane of the vehicle, prevents possible scratching or marring of the vehicle by the chains. It will be observed that the suspension means only engages the tires and the axles of the vehicle and since the tires are composed of rubber, normally no injury or damage can occur to them while it is somewhat immaterial whether or not the axles are scratched by the chains engaging them because such axles are usually not visible.

Although only one form of the invention has been described and illustrated in detail, it will be apparent to those skilled in the art that various modifications may be made without departing from the scope of the appended claims.

I claim:

1. The combination with a freight car or the like, of a cradle for embracing a tire of a vehicle in the car, said cradle comprising tubular metal sections connected together, and flexible means connected to the car, extending through certain of the sections and connected to the vehicle axle, for supporting the vehicle in the car.

2. The combination with a freight car or the like, of a cradle for embracing a tire of a vehicle in the car, said cradle comprising tubular metal sections connected together, and flexible means connected to the car, extending through certain of the sections and connected to the vehicle axle for supporting the vehicle in the car, said flexible means including a resilient connection.

3. The combination with a freight car or the like, of flexible means adjustably connected to upper, opposite sides of the car, tire engaging devices connected to lower parts of said means for suspending a vehicle in the car and other means adjustably connected to lower parts of the car and to the tire engaging devices, a wall of the car having a recess for receiving the tire engaging devices when the latter are not in use and said tire engaging device being movable into the recess without disconnecting the flexible means from the upper part of the car.

4. In a car loading device, a cradle for embracing the tire of a vehicle and holding the vehicle in the car, said cradle comprising tubular metal sections adapted to extend substantially parallel to the plane of and at opposite sides of the tire, and flexible elements directly connecting the sections and adapted to extend transversely under the tire.

5. In a car loading device, a cradle for embracing the tire of a vehicle and holding the vehicle in the car, said cradle comprising spaced rigid members substantially parallel to the plane of the tire and at the sides thereof, and flexible chains transversely connecting the rigid members.

6. In a car loading device, a cradle for engaging a tire of a vehicle in the car and supporting the vehicle thereby, said cradle comprising a side member and tubular end members, flexible means extending through such end members, and means connecting such flexible members at opposite ends to the car and to the axle of the vehicle respectively.

7. In combination with a freight car or the like, of a device for engaging a tire on a vehicle in the car and supporting the vehicle thereby, said device comprising spaced side members adapted to extend substantially parallel to and along opposite sides of the tire respectively, and flexible chain members transversely connecting the side members and adapted to engage the tread of the tire laterally thereof.

RAYMOND W. CHALMERS.